March 23, 1965  W. E. MILLER  3,174,408
PRESSURE LOADED FLUID MOTOR WITH HIGH STARTING TORQUE
Filed Oct. 10, 1961
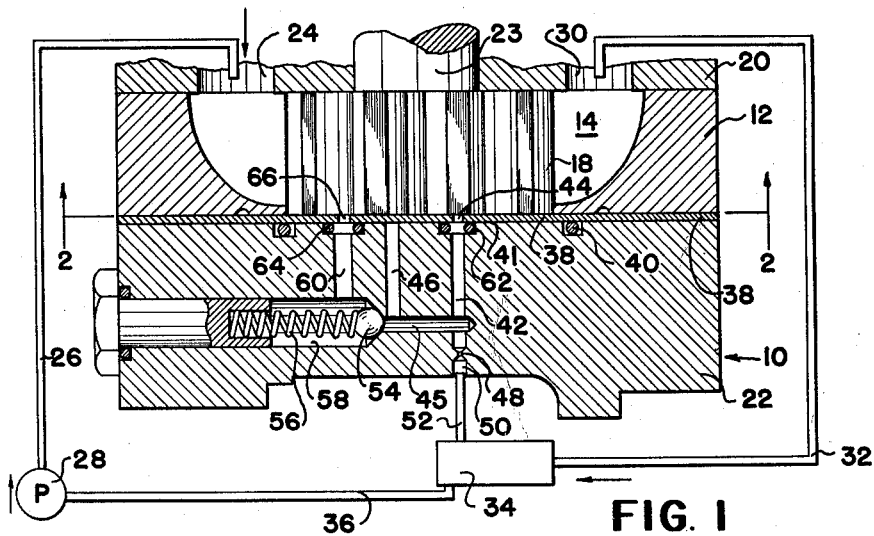
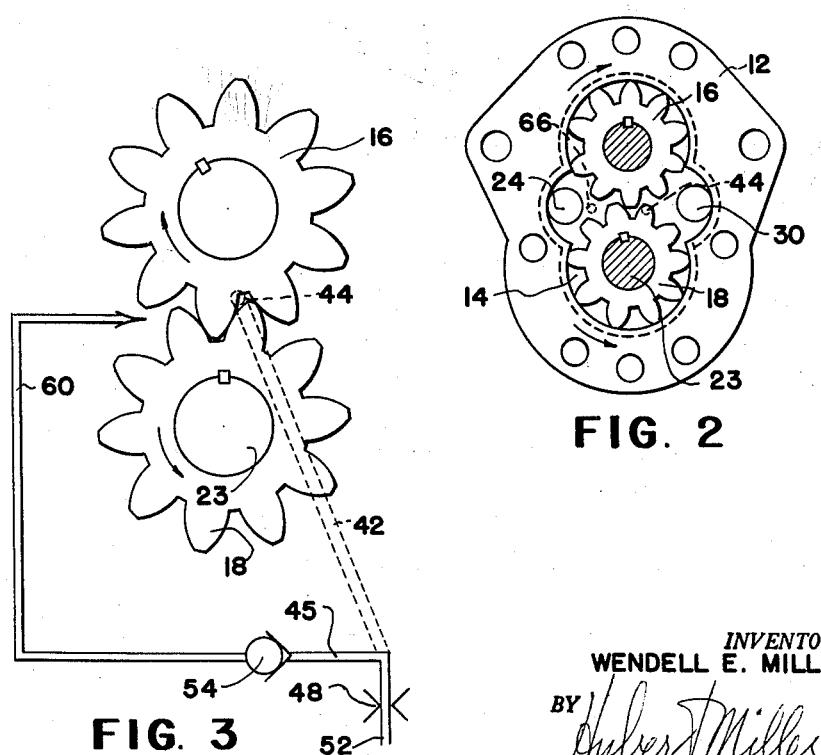
*INVENTOR.*
WENDELL E. MILLER
BY
ATTORNEY

United States Patent Office 3,174,408
Patented Mar. 23, 1965

3,174,408
PRESSURE LOADED FLUID MOTOR WITH
HIGH STARTING TORQUE
Wendell E. Miller, Hutchinson, Kans., assignor to The
Cessna Aircraft Company, Wichita, Kans., a corporation of Kansas
Filed Oct. 10, 1961, Ser. No. 144,146
9 Claims. (Cl. 91—87)

This invention relates in general to gear motors. More particularly it relates to gear motors employing pressure loaded bushings or plates urged into sealing engagement against the faces of the rotating gears, and including a new and useful means for reducing the pressure against such plates during low speed and starting thereof and for maintaining an advantageous pressure thereagainst and high volumetric efficiency of the motor during normal operating speeds.

In a fluid motor it is essential to maintain the static friction acting on the gears of the motor at a minimum in order to achieve a high starting torque. It is also important to maintain good volumetric efficiencies at normal running speeds. To achieve good volumetric efficiency at normal running speed and at high discharge pressure it is usual to employ a sealing plate which is maintained in pressure contact with the end faces of the gears. Such plates have normally been maintained in this pressure contact by fluid pressure which is applied to one face of the sealing plate to force the opposite face into sealing contact with the end faces of the gears. A disadvantage of such a construction is that high friction results which decreases the starting torque of such a motor to an impractical value.

In accordance with the present invention there is provided a fluid gear motor employing a deflectable or floating pressure plate and including means for relieving the pressure against the plate at low speeds for reducing static friction and for obtaining a high starting torque. This construction permits a reduction of the pressure acting on the floating plate so that high starting torque is obtained with a somewhat lower volumetric efficiency for the motor. Means are provided to increase the pressure loading to force the sealing plate against the gear faces and increase the volumetric efficiency after the motor has come up to normal speed.

In accordance with this invention the pressure plate sealing pressure is controlled by directing a portion of the fluid flow of the motor through a passageway extending from a port located in the area of the meshing gears at the outlet side of the motor. This fluid flow discharges through a flow restriction means into a low pressure discharge or reservoir tank. Said passageway connects with at least one additional passageway which communicates with a fluid pressure loading zone which is defined between the sealing plate and an end plate of the motor.

When the flow through the passageway is small, the pressure will for the most part be relieved through the flow restriction means, resulting in only slight pressure in the pressure loading zone behind the sealing plate. In some cases, the flow restriction means can consist of a fixed orifice connected to the low pressure discharge. An increase of flow in the passageway, caused when the flow through the motor gradually increases, causes an increase in pressure upstream of the orifice and effects pressurizing of the sealing plate to force it into contact with the end faces of the gears to achieve a greater efficiency as the motor comes up to speed.

At some rotational speed of the motor the quantity of oil being pumped by the meshing gears through the passageway creates a sufficient pressure in the ducts communicating with the pressure loading zone or chamber which pressurizes the sealing plate to effect positive sealing of the plate against the adjacent gear faces. The oil flow is due to the quantity continuously being trapped by the gear teeth coming into mesh. The area, shape and location of the fluid loading chamber is chosen so that the pressure required to effectively seal the gear chamber is approximately equal to, or slightly greater than, the inlet pressure at which the motor is operated.

When the motor speed increases beyond a point which is required to properly seal the end faces of the gears by the sealing plate, pressure in the passageway which communicates with the outlet rises to a value which is equivalent to or greater than the inlet pressure of the motor. For this reason a passageway is provided having a check valve which is opened in response to a predetermined pressure differential to bypass the sealing fluid back into the inlet side of the fluid motor. Thus, the fluid trapping action of the meshing teeth of the gears will not cause a sealing pressure to act on the sealing plate which is above that required to pressure load the side faces for good volumetric efficiency. Since the check valve acts to permit a bypass flow of liquid back to the inlet of the motor it effectively decreases the displacement of the motor during its normal running speed. Because the check valve permits a portion of the motor displacement to be recirculated, the running displacement of the motor will be less than the starting displacement. Therefore, it is theoretically possible to obtain more than 100% starting torque by use of this invention.

Accordingly, it is an object of this invention to provide an improved means for regulating the sealing pressure applied to a sealing plate to urge it into sealing contact with the end faces of the rotor or rotors of a fluid driven motor.

A further object of the invention is to provide a hydraulic gear motor including a pressure plate which is biased against the end faces of the operating gears at normal operating speeds and including means to materially reduce such biasing at low or starting speeds.

A further object of the invention is to provide a hydraulic gear motor including a sealing plate biased against the end faces of the gears by fluid pressure in a fluid pressure loading or sealing chamber having fluid passages in communication therewith and connecting to a bypass passage connected to the inlet side of the motor, the pressure in the loading chamber being controlled by passing a portion of the liquid circulated by the motor through flow restriction means such as an orifice whereby the pressure of the fluid passing through the orifice causes a gradual buildup of pressure acting in the pressure loading chamber to cause sealing contact of the pressure plate with the end faces of the gears when the motor reaches a predetermined or a normal operating speed.

A further object of the invention is to provide a fluid gear motor including a pressure plate which is urged against the end faces of the operating gears by fluid in a fluid pressure loading chamber the pressure in which is controlled by bypassing a portion of fluid directed through the motor back to the inlet through a bypass passage under the control of a valve, said valve consisting of a check valve or spring loaded relief valve, and in either case having a discharge which communicates with the inlet of the motor, and having an inlet to the valve which communicates with the pressure loading chamber.

A further object of the invention is to provide a fluid motor including a floating sealing plate which is pressured against the end faces of the rotating gears during running speed operation of the motor but which floats substantially freely at low speed operation.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

In the drawing:

FIG. 1 is a transverse sectional view of a pressure loaded gear motor constructed in accordance with the invention and indicating schematically the connections to an operating pump and liquid reservoir;

FIG. 2 is a sectional view of the pump taken along the line 2—2 of FIG. 1; and

FIG. 3 indicates schematically the sealing plate pressure loading control system fluid connections.

Referring to the drawing in particular, there is illustrated a pressure loaded fluid motor generally designated 10 including a central body housing 12 hollowed to define a rotor or gear chamber 14 of which the rotor means consists of a pair of gears 16 and 18 supported on parallel shafts for rotation between two end plates 20 and 22. The gear 18 is fast to the driven output shaft 23 of the motor 10. The end plate 20 includes an inlet 24 which communicates with a conduit 26 to receive a liquid supply from a fluid pump 28. A discharge outlet 30, defined in the end plate 20, communicates through a conduit 32 with a reservoir 34. The pump intake is connected through a conduit 36 with the reservoir 34.

A sealing plate 38 is seated on an O-ring seal 40, which in turn is seated in a recess in the adjacent face of end plate 22. The interface space between the plates 22 and 38 in the area within the O-ring 40 actually has a finite thickness, though being imperceptible in the drawing, and the resulting chamber constitutes a pressure loading or sealing zone 41.

In accordance with the invention the pressure in the pressure loading chamber 41 is controlled by a fluid system which includes a passage 42 which communicates with the gear chamber 14 through a sealing plate opening or port 44 located in an area which is called the gear tooth fluid trapping zone, the relative location being more clearly indicated by the phantom lines 44 in FIG. 2. A circular gasket or O-ring 62 forms a continuous passage between port 44 in the plate and the adjacent end of the passage 42. The passage 42 communicates through a cross or header passage 45 with an axial passage 46 which is in open communication with the pressure loading zone 41. Liquid which is trapped and discharged through port 44 in small volume (i.e.—during motor starting) can escape due to internal motor leakage which serves in effect as a flow restriction means and which becomes a limiting factor only at higher volumes of flow. This effect can be changed to the degree desired by providing, in addition, a fixed orifice 48 which is connected through a low pressure discharge passage 50 and conduit 52 back to the reservoir 34. At low motor operating speeds the volume flow through the port 44 is not sufficient to increase the pressure in the pressure loading chamber 41 an appreciable amount, and hence the plate 38 does not provide any frictional retarding force acting on the gears which will lower the starting torque.

As gear speed increases the volume of fluid which is forced into passage 42 becomes greater and the restriction to flow offered by the internal motor leakage path alone or together with the orifice 48, if provided as aforesaid, causes an increase in pressure in the passages 42, 45 and 46, and in the pressure loading zone or chamber 41, causing the pressure plate 38 to be urged against the end faces of the gears in tight sealing contact.

When the motor speed increases beyond the point which is required to properly seal the gear chamber the increased volume of fluid trapped between the teeth of gears 16 and 18 raises the pressure in the duct or passage 45 to a value slightly higher than the inlet pressure of the fluid motor. When this occurs the excess of fluid being pumped into passage 45 is forced through a ball check valve 54 which is biased by a spring 56 onto a seat at the end of the passage 45. Liquid then flows into a chamber 58 and through a passage 60, a sealing gasket or O-ring 64, and a port 66 in the sealing plate into the inlet side of the gear chamber 14. The ball check valve 54 thus serves to prevent the pumping action of the meshing gears from increasing the pressure in the chamber 41 to a value above that required to pressure load the plate for proper sealing of the gear chamber.

Drawing FIG. 3 illustrates schematically the flow of gear tooth trapped fluid through port 44, passages 42 and 45, through the check valve 54 and back to the inlet through the passage 60. Should a particular motor design require that the pressure loading pressure be above that of the inlet pressure this can be accomplished by using a heavier check valve spring 56.

An added feature of the present construction is that any flow that is bypassed through the check valve 54 to the inlet of the motor decreases the effective displacement of the motor. Hence, the running displacement of the motor, after effective sealing pressure has been applied to the plate 38, will be less than the starting displacement. Therefore, it is theoretically possible to obtain more than 100% starting torque by the use of this arrangement.

While a specific embodiment of the invention has been shown and described in detail to illustrate the application of the invention principles, it will be understood that the invention may be embodied otherwise without departing from such principles.

Having described the invention with sufficient clarity to enable those familiar with this art to construct and use it, I claim:

1. In a fluid gear motor including a housing having a hollowed body section defining a gear chamber, a pair of mating gears arranged to rotate in said gear chamber and presenting meshing teeth, said gear chamber provided with an inlet on one side of said gears and with a low pressure discharge on the outlet side of said gears, an end plate closing one end of said gear chamber and confronting the end faces of said gears at that end, the improvement comprising: a pressure sealing plate between the end faces of said gears and said end plate and defining with the latter a pressure loading zone, a first duct connected to that zone of said gear chamber, on the outlet side thereof, in which fluid is trapped and pressurized between the meshing gear teeth, a second duct connected to said pressure loading zone, a header duct interconnecting said first and second ducts, a third duct connecting said header duct and said gear chamber at the inlet side thereof, a check valve interposed between and affording flow from said header duct into said third duct in response to a predetermined pressure differential therebetween, and an orificed duct connected to said header duct and affording limited flow from said header duct in a path communicating with said low pressure discharge.

2. In a fluid gear motor including a housing having a hollowed interior defining a gear chamber, a pair of mating gears arranged to rotate in said gear chamber and presenting meshing teeth, said gear chamber provided with an inlet on one side of said gears and with a low pressure discharge on the outlet side of said gears, an end plate confronting the end faces of said gears, and a pressure sealing plate between the end faces of said gears and said end plate and defining with the latter a pressure loading zone, the improved construction comprising: pressure control means connected to said pressure loading zone and said gear chamber and responsive to fluid pressure caused by rotation of said gears to apply pressure to said pressure plate at normal operative rotational speeds of said gears, and to withdraw pressure from said fluid pressure control zone during slow speed rotation of said gears, said control means including a first duct affording escape of gear trapped fluid from the low pressure side of said gear chamber, a second duct affording introduction of gear trapped fluid pressure directly into said pressure loading zone, a third duct affording flow of gear trapped fluid into the inlet side of said gear chamber, a header duct interconnecting said first, second, and third ducts, flow restriction means affording limited escape of gear trapped fluid from said pressure loading zone into said low pressure discharge, and a check valve interposed between and affording flow from said header duct to said third duct in response to pressure differential one-way between said ducts.

3. In a pressure fluid driven motor which includes
  (a) a housing defining a working chamber,
  (b) fluid pressure rotatable means within the chamber establishing in conjunction with the walls thereof
    (1) a high pressure fluid inlet zone,
    (2) a low volume variable pressure fluid discharge zone, the pressure and volume discharge from which vary as a function of the rotational speed of said rotatable means, and
    (3) an outlet for conducting used working fluid from the working chamber to a zone of low pressure, and
  (c) a sealing member constituting an axially movable end wall of said working chamber for end sealing against said rotatable means, and forming together with adjacent portions of said housing a fluid pressure loading or sealing zone into which pressure fluid is introduced to urge the sealing member into end sealing contact with said rotatable means,
an improved means for controlling the sealing pressure in the pressure loading zone of such a motor which comprises:
  means for conducting fluid under pressure from said working chamber into said pressure loading zone;
  duct means affording communication between said pressure loading zone and said high pressure fluid inlet zone;
  and a spring-pressed check valve in said last mentioned duct means affording flow of fluid from said pressure loading zone into said high pressure fluid inlet zone in response to a predetermined pressure excess in said pressure loading zone.

4. In a pressure fluid driven motor which includes
  (a) a housing defining a working chamber,
  (b) at least two peripherally cooperating fluid pressure rotatable elements within the chamber having the inherent characteristic of trapping and pressurizing a variable quantity of fluid between them near the location of their peripheral cooperation as they are rotated, said elements establishing, between them and in conjunction with the walls of said chamber
    (1) a high pressure fluid inlet zone,
    (2) a trapped fluid discharge zone in which the fluid volume and pressure vary as a function of the rotational speed of said elements, and
    (3) an outlet for conducting used working fluid from the working chamber to a zone of low pressure, and
  (c) a sealing member constituting an axially movable end wall of said working chamber for end sealing against said rotatable elements, and forming together with adjacent portions of said housing a fluid pressure loading or sealing zone into which pressure fluid is introduced to urge the sealing member into end sealing contact with said rotatable elements,
an improved means for controlling the sealing pressure in the pressure loading zone of such a motor which comprises:
  duct means independent of the working chamber outlet affording communication between said trapped fluid discharge zone and said pressure loading zone;
  and means independent of the working chamber outlet defining a limited volume flow leakage path affording communication between said trapped fluid discharge zone and a zone of low pressure,
  whereby at slow and starting speeds of said rotatable elements volume accumulation of fluid and consequently increase of fluid pressure in said pressure loading zone is delayed due to disposal of a limited volume of fluid through said leakage path, and full sealing pressure in said pressure loading zone is subsequently provided as normal working speed is approached by said rotatable elements.

5. The motor described in claim 4 and duct means affording communication between said pressure loading zone and said high pressure fluid inlet zone; and a spring-pressed check valve in said last mentioned duct means affording flow of fluid from said pressure loading zone into said high pressure fluid inlet zone in response to a predetermined pressure excess in said pressure loading zone.

6. In a pressure fluid driven motor which includes
  (a) a housing defining a working chamber,
  (b) meshed gears rotatable within the chamber and establishing in conjunction with the walls therein
    (1) a high pressure working fluid inlet zone,
    (2) a low volume variable pressure gear tooth trapped fluid discharge zone, the pressure in and volume discharge from which vary as a function of the gear rotational speed, and
    (3) an outlet for conducting used working fluid from the working chamber to a zone of low pressure, and
  (c) a sealing member constituting an axially movable end wall of said working chamber and forming, together with the adjacent end portion of said housing, a pressure loading or sealing zone into which fluid under pressure is introduced to urge the sealing member into sealing contact with the adjacent end faces of said gears,
an improved means for controlling the fluid pressure in said pressure loading zone comprising:
  a first duct affording communication between said pressure loading zone and said variable pressure zone;
  a second duct affording communication between said first duct and a zone of low pressure;
  and flow restricting orifice means in said second duct, whereby at slow and starting speeds of said gears volume accumulation and consequently increase of fluid pressure in said pressure loading zone is delayed due to disposal of a limited volume of gear tooth trapped fluid through said second duct, and full sealing pressure in said pressure loading zone is not attained until said gears approach normal working speed, and the volume of gear tooth trapped fluid is much larger than can be disposed of through said second duct.

7. In a pressure fluid driven motor which includes
  (a) a housing defining a working chamber,
  (b) meshed gears rotatable within the chamber and establishing in conjunction with the walls therein
    (1) a high pressure working fluid inlet zone,
    (2) a low volume variable pressure gear tooth trapped fluid discharge zone, the pressure in and volume discharge from which vary as a function of the gear rotational speed, and
    (3) an outlet for conducting used working fluid from the working chamber to a zone of low pressure, and
  (c) a sealing member constituting an axially movable end wall of said working chamber and forming, together with the adjacent end portion of said housing, a pressure loading or sealing zone into which fluid under pressure is introduced to urge the sealing member into sealing contact with the adjacent end faces of said gears,
an improved means for controlling the fluid pressure in said presusre loading zone comprising:
  a first duct affording communication between said variable pressure zone and said pressure loading zone;
  a second duct affording communication between the pressure loading zone and said high pressure inlet zone;

and a one way valve in said second duct responsive to a predetermined pressure differential to afford flow of fluid from said pressure loading zone into said high pressure fluid inlet zone.

8. In a pressure fluid driven gear type motor which inherently includes a gear tooth fluid trapping zone in the working chamber in which zone pressure varies as a function of the rotational speed of the gears, and in which motor one side surface of an axially movable sealing member is urged into sealing engagement with an adjacent end face of the gears by subjecting its opposite side surface to fluid under pressure introduced into a pressure loading zone which is partially defined by said sealing member, the method of operating such a motor which comprises:

conducting fluid from said gear tooth fluid trapping zone in the working chamber to the pressure loading zone;

and continuously bleeding off to a zone of lower pressure a limited portion of the fluid being conducted to said pressure loading zone, whereby the increase in pressure in said pressure loading zone to full sealing pressure, and hence the full frictional contact of the sealing member against the gear faces, is delayed by the bleeding off of fluid until the gears of the motor approach full operational speed.

9. In a pressure fluid driven motor which includes (a) a housing defining a working chamber, (b) at least two peripherally cooperating fluid pressure rotatable elements within the chamber having the inherent characteristic of trapping and pressurizing a variable quantity of fluid between them near the location of their peripheral cooperation as they are rotated, said elements establishing, between them and in conjunction with the walls of said chamber (1) a high pressure fluid inlet zone to said working chamber, (2) a low pressure fluid outlet zone in said working chamber separated from said inlet zone, (3) a trapped fluid discharge zone, separated from said inlet zone and from said outlet zone, in which the fluid volume and pressure vary as a function of the rotational speed of said rotatable elements, and (4) an outlet for conducting used working fluid from said outlet zone of the working chamber to a zone of low pressure, and (c) a sealing member constituting an axially movable end wall of said working chamber for end sealing against said rotatable elements, and forming, together with adjacent portions of said housing, a fluid pressure loading or sealing zone into which pressure fluid is introduced to urge the sealing member into end sealing contact with said rotatable elements, an improved means for controlling the sealing pressure in the pressure loading zone of such a motor which comprises:

means affording fluid pressure communication between said trapped fluid discharge zone and said pressure loading zone.

References Cited by the Examiner

UNITED STATES PATENTS

| | | | |
|---|---|---|---|
| 2,310,078 | 2/43 | Herman | 103—126 |
| 2,345,975 | 4/44 | Herman | 103—126 |
| 2,437,791 | 3/48 | Roth et al. | 103—126 |
| 2,487,732 | 11/49 | Schanzlin | 103—126 |
| 2,512,025 | 6/50 | Lauck | 103—126 |
| 2,627,232 | 2/53 | Lauck | 103—126 |
| 2,657,533 | 11/53 | Schanzlin et al. | 103—126 |
| 2,665,641 | 1/54 | Lauck | 103—126 |
| 2,682,836 | 7/54 | Orr | 103—126 |
| 2,684,631 | 7/54 | Anthony et al. | 103—126 |
| 2,718,758 | 9/55 | Minshall et al. | 103—126 |
| 2,742,862 | 4/56 | Bankes | 103—126 |
| 2,772,638 | 12/56 | Nagely | 103—126 |
| 2,787,224 | 4/57 | Udale | 103—126 |
| 2,845,868 | 8/58 | Norlin | 103—126 |
| 2,845,873 | 8/58 | Lapsley | 103—126 |
| 2,915,976 | 12/59 | Demtchenko | 103—126 |
| 2,915,977 | 12/59 | Campbell | 103—126 |
| 2,929,331 | 3/60 | Lorenz | 103—126 |
| 2,965,036 | 12/60 | Wood | 103—126 |
| 2,972,959 | 2/61 | Wilson et al. | 103—126 |
| 2,997,960 | 8/61 | Kimijima et al. | 103—126 |
| 3,000,323 | 9/61 | Park et al. | 103—126 |
| 3,019,737 | 2/62 | Prosse | 103—126 |
| 3,025,796 | 3/62 | Miller | 103—126 |
| 3,029,739 | 4/62 | Nagely | 103—126 |
| 3,034,451 | 5/62 | Sullivan et al. | 103—161 |

JOSEPH H. BRANSON, Jr., *Primary Examiner.*

KARL J. ALBRECHT, *Examiner.*